(12) United States Patent
Hayashikawa et al.

(10) Patent No.: US 6,331,995 B2
(45) Date of Patent: Dec. 18, 2001

(54) GAS LASER OSCILLATOR

(75) Inventors: Hiroyuki Hayashikawa, Toyonaka; Satoshi Eguchi, Takatsuki; Takayuki Yamashita, Toyonaka, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/843,747

(22) Filed: Apr. 30, 2001

Related U.S. Application Data

(62) Division of application No. 09/120,886, filed on Jul. 23, 1998.

(30) Foreign Application Priority Data

| Jul. 30, 1997 | (JP) | 9-203669 |
| Aug. 5, 1997 | (JP) | 9-210669 |
| Aug. 5, 1997 | (JP) | P9-210672 |

(51) Int. Cl.$^7$ .................. H01S 3/08; H01S 3/04
(52) U.S. Cl. .................. 372/107; 372/35
(58) Field of Search .................. 372/107, 92, 34, 372/35

(56) References Cited

U.S. PATENT DOCUMENTS

| 3,713,043 | 1/1973 | Avivi et al. | 372/62 |
| 4,242,646 | * 12/1980 | Macken | 372/58 |
| 5,319,664 | 6/1994 | Nishida | 372/61 |
| 6,081,544 | * 6/2000 | Zamel et al. | 372/107 |

FOREIGN PATENT DOCUMENTS

| 0 492 340 | 7/1992 | (EP) . |
| 2.073.481 | 10/1997 | (FR) . |
| 2 020 890 | 11/1979 | (GB) . |
| 2117558 | 10/1983 | (GB) . |
| 56-90588 | 7/1981 | (JP) . |
| 61-097983 | 5/1986 | (JP) . |
| 1-057694 | 3/1989 | (JP) . |

* cited by examiner

*Primary Examiner*—James W. Davie
(74) *Attorney, Agent, or Firm*—Wenderoth, Lind & Ponack, L.L.P.

(57) ABSTRACT

A gas laser oscillator having at least three discharge tubes disposed along the optical axis, and a spacer having an opening centered on the optical axis. The spacer is disposed between a partially reflective mirror and the closest discharge tube. Further, the discharge tubes are disposed in series along the optical axis, and satisfy the following three formulas simultaneously:

| $r1/r2 > 1.0$ | Formula 1 |
| $L2/(L1+L2) < 0.85$ | Formula 2 |
| $r3/r2 < 1.4$ | Formula 3 | where the sum of lengths of a pair of discharge tubes disposed at both ends in optical axis direction is L1, the inside diameter of these discharge tubes is r1, the sum of lengths of the other discharge tubes in the optical axis direction is L2, the inside diameter of these discharge tubes is r2, and the inside diameter of the opening of the spacer is r3.

2 Claims, 14 Drawing Sheets

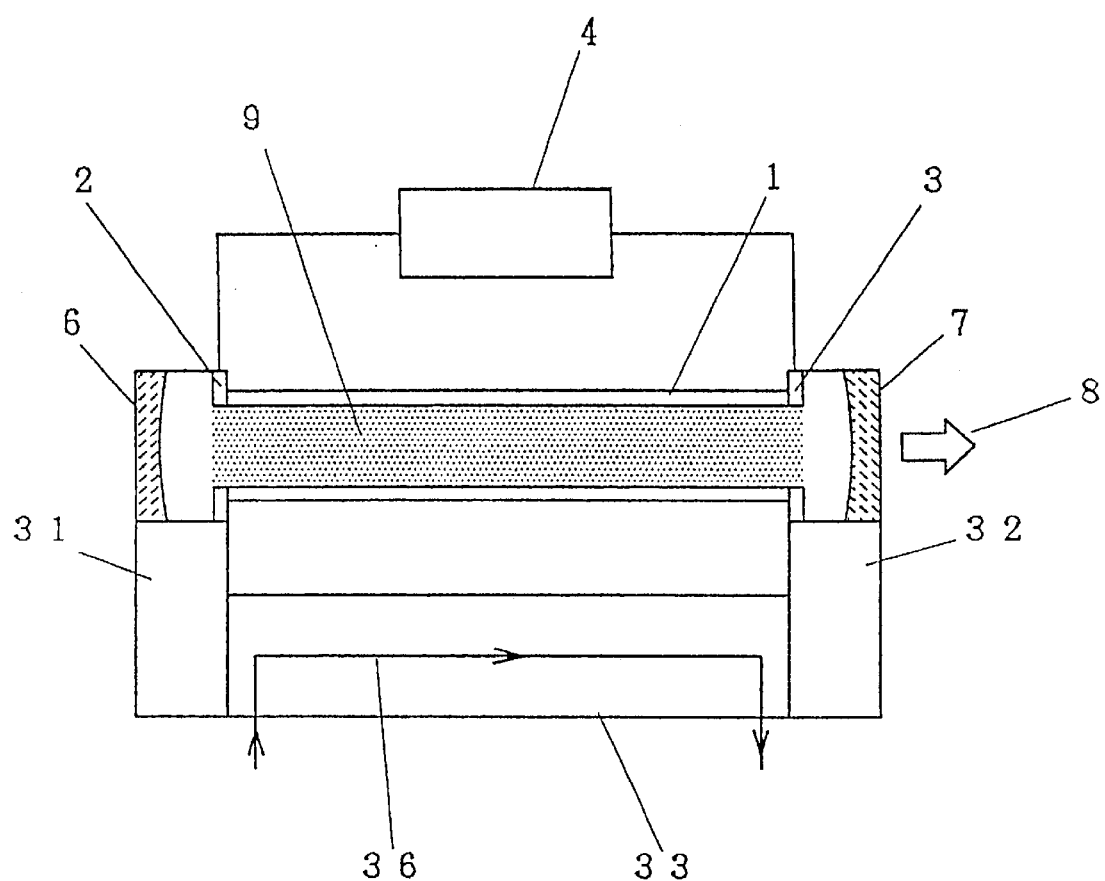
[Fig. 8]

[Fig. 9]
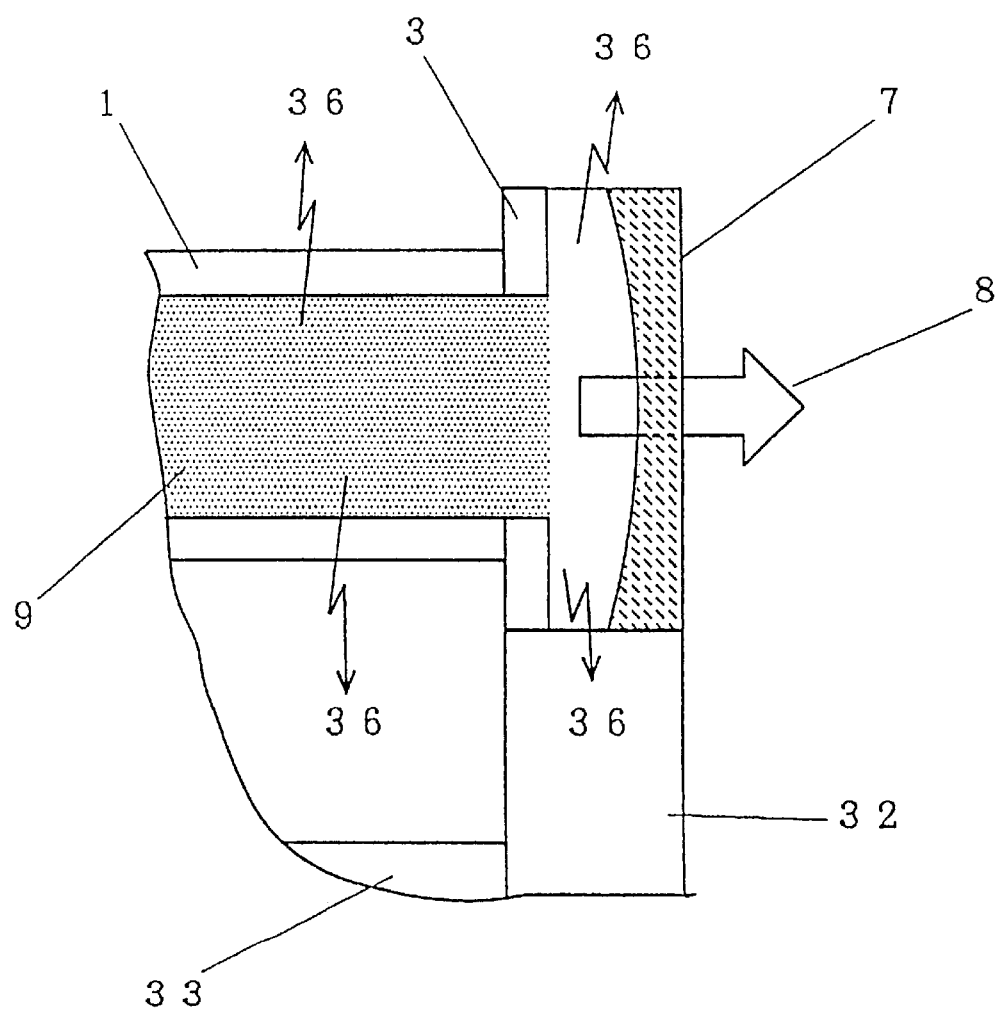

[Fig. 10]
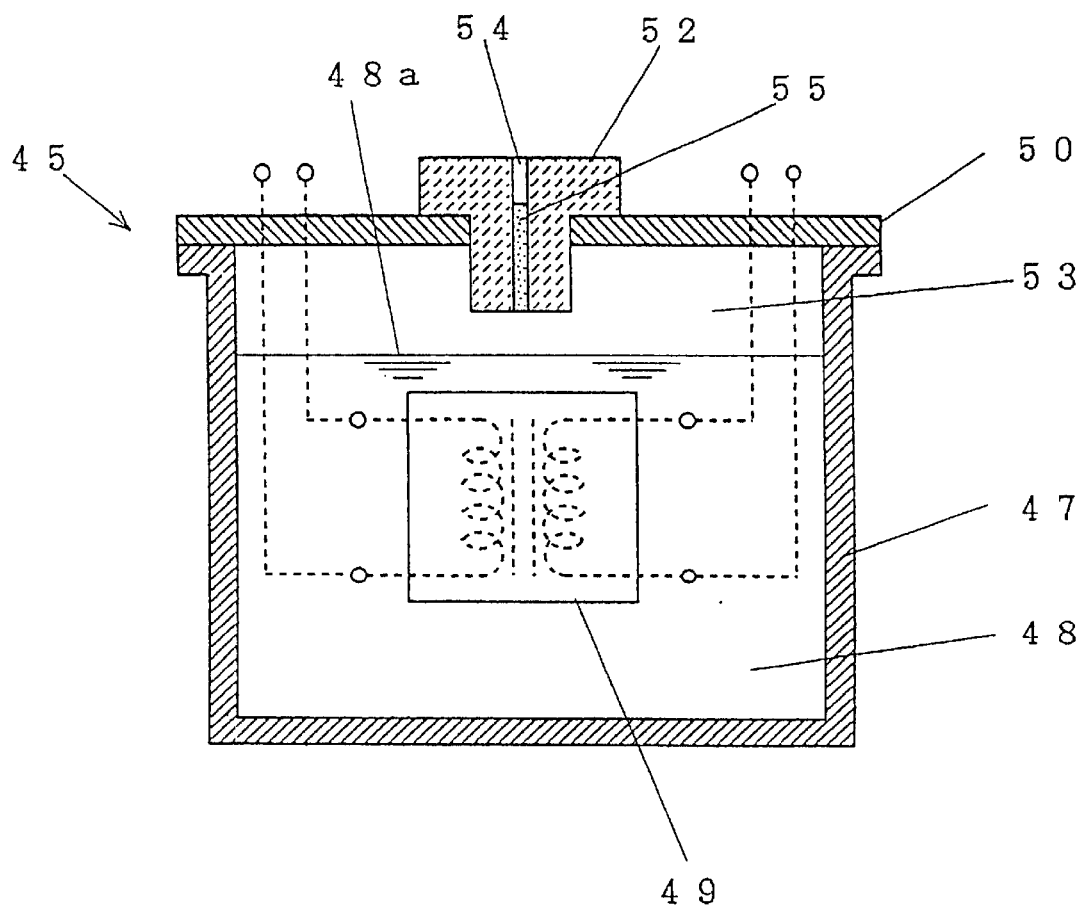

[Fig. 11]
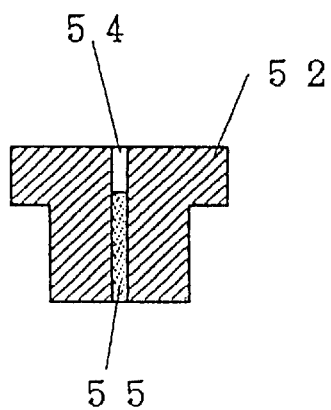
[Fig. 12]
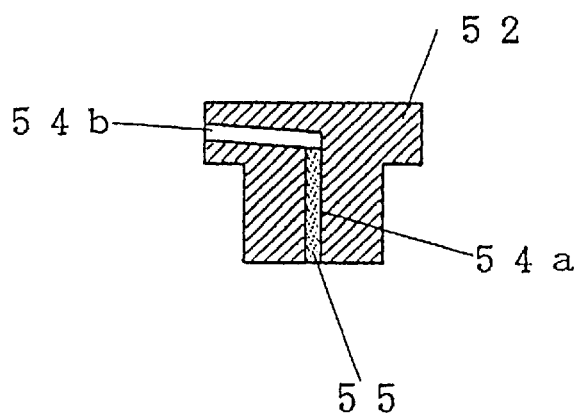
[Fig. 13]
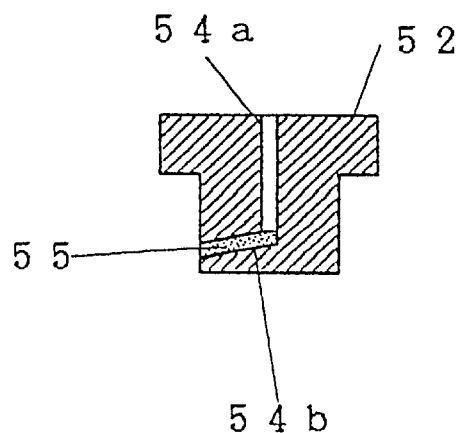

[Fig. 14]
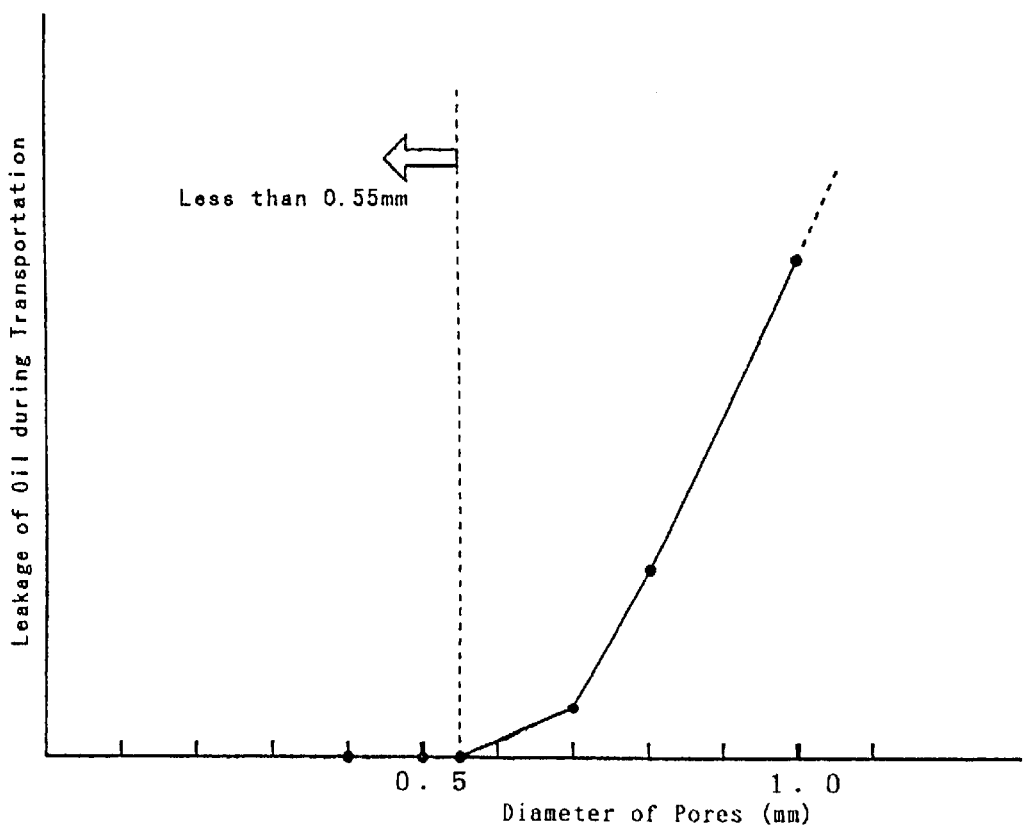

[Fig. 15]
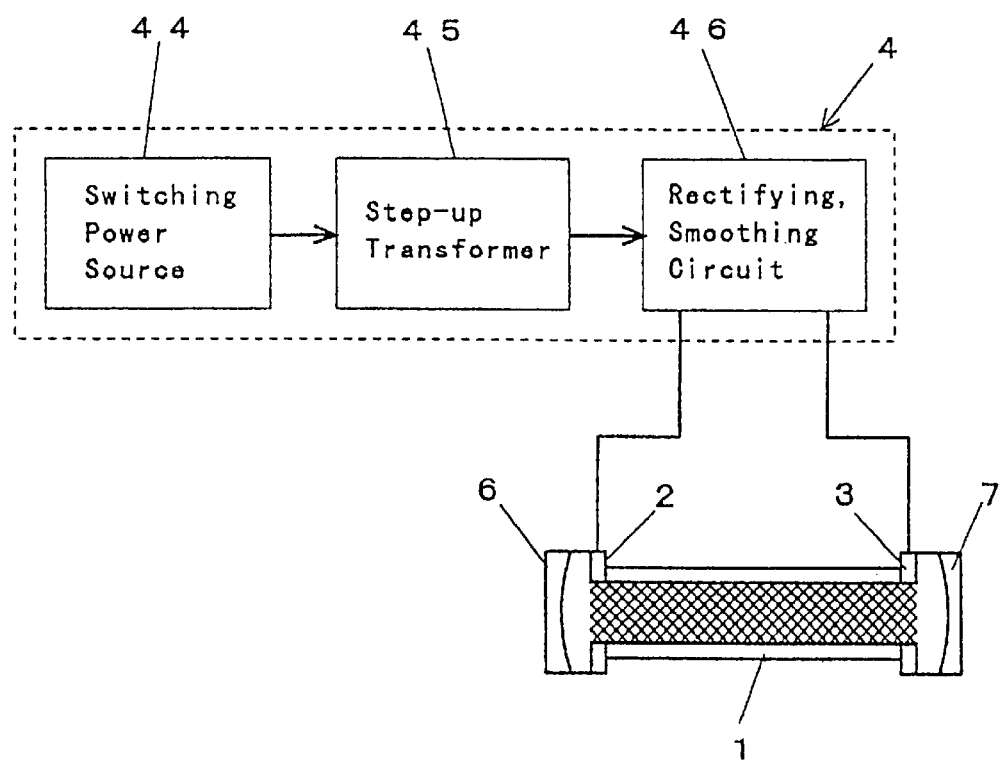

GAS LASER OSCILLATOR

This is a divisional application of Ser. No. 09/120,886, filed Jul. 23, 1998.

BACKGROUND OF THE INVENTION

The present invention relates to a gas laser oscillator having an optical axis that is matched with the axial direction of the discharge tube, and more particularly to a gas laser oscillator capable of obtaining a laser beam of high quality.

FIG. 4 is a schematic block diagram of a conventional gas laser oscillator. In FIG. 4, reference numeral 1 is a discharge tube made of glass or other dielectric material, and the inside of the discharge tube 1 is filled with laser gas, or laser gas is circulated by a gas circulating apparatus not shown in the drawing. Reference numerals 2 and 3 are electrodes disposed at both ends of the discharge tube 1, reference numeral 4 is a high voltage power source connected to the electrode 2 and electrode 3, and reference numeral 5 is a discharge space inside the discharge tube 1 lying between the electrode 2 and electrode 3. Reference numeral 6 is a fully reflective mirror disposed toward one opening of the discharge space 5, and reference numeral 7 is a partially reflective mirror disposed toward the other opening of the discharge space 5, and the fully reflective mirror 6 and partially reflective mirror 7 form an optical resonator. Reference numeral 8 is a laser beam emitted from the partially reflective mirror 7.

In the conventional gas laser oscillator, the operation is described below. Discharge occurs in the discharge space 5 between the electrode 2 and electrode 3 connected to the high voltage power source 4. By this discharge, the laser gas in the discharge space 5 is excited by the discharge energy. The excited laser gas is set in a state of resonance by the optical resonator formed by the fully reflective mirror 6 and partially reflective mirror 7, and being optically amplified by this resonance, the laser beam 8 is issued from the partially reflective mirror 7. This laser beam 8 is used in various applications of laser processing.

FIG. 5(a) and FIG. 5(b) are diagrams for explaining the operation of the optical resonator in the gas laser oscillator, showing more specifically the structure of the gas laser oscillator. In FIG. 4, only one discharge tube is shown, but generally, as shown in FIG. 5(a) and FIG. 5(b), plural discharge tubes 1 are disposed in series along the optical axis. Although mere cylindrical forms are expressed in FIG. 5(a) and FIG. 5(b), same as the discharge tube 1 in FIG. 4, an electrode 2 and an electrode 3 are disposed at both ends of each discharge tube 1, and a high voltage power source 4 is connected between each pair of electrodes, that is, electrode 2 and electrode 3, and a discharge space is formed inside of each discharge tube 1.

In the gas laser oscillator shown in FIG. 5(a) and FIG. 5(b), when discharge occurs in the discharge space 5, a standing wave 10 is formed. The property of this standing wave 10 is determined by the size of the resonance space 9 and the curvature of the fully reflective mirror 6 and partially reflective mirror 7. This property of standing wave is known as TEM (transverse electromagnetic) mode order. Generally the lower the TEM mode order, the better is the laser beam converging, and it is known that higher processing performance is obtained. For example, the smaller the inside diameter of the discharge tube 1, the narrower is the resonance space, and therefore oscillation of high-order TEM mode is suppressed, the TEM mode order becomes lower and light converging is enhanced, so that a laser beam of high processing performance is obtained.

On the other hand, in the gas laser oscillator having thus explained construction, of the electric energy supplied from the high voltage power source 4, all energy excluding the portion converted into the laser beam 8 becomes heat. Therefore, to maintain the parallelism between the fully reflective mirror 6 and partially reflective mirror 7 by preventing deformation due to this generated heat, it is necessary to cool the fully reflective mirror 6 and partially reflective mirror 7 and the peripheral parts supporting them.

Concerning cooling of the fully reflective mirror 6 and partially reflective mirror 7 and their peripheral parts in the conventional gas laser oscillator, as disclosed in Japanese Laid-open Patent No. 56-90588, the construction being shown in FIG. 8. As shown in FIG. 8, the fully reflective mirror 6 and partially reflective mirror 7 for resonance are respectively held by a flange 31 and a flange 32. By coupling these flanges 31 and 32 through a support element 33, the parallelism of the fully reflective mirror 6 and partially reflective mirror 7 necessary for laser oscillation is maintained. A passage 35 is provided inside the support element 33, and it is intended to cool by passing oil or other cooling medium in this passage 35. In the conventional gas laser oscillator, the passage 35 of the cooling medium inside the support element 33 was straight from the inlet to the outlet of the cooling medium.

The high voltage power source 4 is, as shown in FIG. 15, composed of a switching power source 44, a step-up transformer 45, and a rectifying and smoothing circuit 46. Generally, the gas laser oscillator is composed of plural discharge tubes, and each discharge tube requires the step-up transformer 45 and rectifying and smoothing circuit 46. In one switching power source 44, the primary side of plural step-up transformers 45 can be connected, and therefore only one switching power source 44 is enough for plural discharge tubes.

The step-up transformer 45 is composed of a step-up transformer main body 49 and a transformer container 47 as shown in FIG. 16, and the transformer container 47 is filled with insulating oil 48, and the step-up transformer main body 49 composed of coil and core is immersed in the insulating oil 48. A top plate 50 is disposed in the upper part of the transformer container 47, and an oil feed port 51 provided in the top plate 50 is sealed with an oil cap 52 except when feeding oil, so that the entire step-up transformer 44 is in a sealed structure.

The conventional gas laser oscillator thus constructed had several problems.

First, to lower the TEM mode order, in the discharge tube 1 shown in FIG. 5(a), when the inside diameter of the discharge tube 1 is reduced as shown in FIG. 5(b), scattered beam 8a is likely to occur in the resonance space 9, and scattered beam 8a mixes into the laser output. FIG. 6 shows an output mode in a conventional gas laser oscillator. The axis of abscissas in FIG. 6 denotes the distance toward outside from the center of the output laser beam, and position 0 indicates the center. The axis of ordinates represents the energy density of the laser beam. FIG. 6 shows that scattered beam 8a is present in the peripheral region A of the laser beam 8. Laser cutting by using such a laser beam causes an increase in the thermal effects around the cut section due to the scattered beam 8a included in the peripheral region, and lowers the cutting quality. As explained above, when attempting to improve the light converging and enhance the processing performance by lowering the TEM mode order, the scattered beam mixes into the output laser beam to increase the thermal effect range, which leads to a first problem of deterioration of processing quality.

As mentioned herein, in the gas laser oscillator, of the electric energy supplied from the high voltage power source 4, all energy except for the portion converted into the laser beam becomes heat 36. Such heat 36 was dissipated, conducting to the parts composing the gas laser oscillator, such as flanges 31 and 32 existing around the resonance space 9 or the support element 33 for coupling them, through the laser gas filling the resonance space 9 as shown in FIG. 9.

The support element 33 is a member for maintaining the parallelism between the fully reflective mirror 6 and partially reflective mirror 7, and when uniformity of temperature distribution in the support element 33 is lost due to the conducting heat 36, the support element 33 is thermally deformed, and accurate parallelism between the fully reflective mirror 6 and partially reflective mirror 7 cannot be maintained. To avoid this inconvenience, it was designed to cool by passing a cooling medium in the support element 33. However, in the conventional gas laser oscillator, the passage 35 of the cooling medium was straight from the inlet to the outlet of the cooling medium inside the support element 33. Accordingly, heat convection occurs in the cooling medium inside the passage 35, and temperature distribution of the cooling medium itself is not uniform. Due to heat convection of the cooling medium itself, the temperature is higher in the upper part and the temperature is lower in the lower part of the support element 33, and the temperature distribution is uneven, and thermal distortion occurs. This thermal distortion leads to a second problem of making it difficult to maintain the accurate parallelism between the fully reflective mirror 6 and partially reflective mirror 7.

In the step-up transformer 45 of the conventional high voltage power source, the step-up transformer main body 49 was contained in the transformer container 47, and the transformer container 47 was in a sealed structure. Due to the heat generated in the step-up transformer main body 49, the temperature of the insulating oil 48, in which the transformer main body 49 is immersed, and the air 53 in the transformer container 47 are raised. When the transformer container 47 is enclosed by the top plate 50 and oil cap 52, the internal atmospheric pressure in the transformer container is raised, and a pressure difference occurs between the inside and outside of the transformer container 47. This pressure difference causes the insulating oil 48 to leak out of the transformer container 47.

To eliminate the pressure difference between the inside and outside of the transformer container 47, as shown in FIG. 17, a penetration hole was provided in the oil cap 52. As a result, occurrence of a pressure difference between the inside and outside of the transformer container 47 could be prevented, but the insulating oil 48 splashed up and leaked during transportation. FIG. 18 and FIG. 19 are modified examples of the penetration hole provided in the oil cap 22, but it was a third problem that leakage of the insulating oil 48 could not be prevented completely.

SUMMARY OF THE INVENTION

The invention is devised to solve these problems, and it is a first object thereof to offer a gas laser oscillator capable of obtaining a laser beam of high quality by suppressing occurrence of scattered beam while lowering the output laser TEM mode order.

It is a second object of the invention to offer a gas laser oscillator capable of maintaining parallelism of fully reflective mirror and partially reflective mirror for composing an optical resonator, and obtaining a stable laser beam, by preventing thermal deformation of support element and other members due to heat generated by laser oscillation.

It is a third object of the invention to offer a gas laser oscillator capable of preventing occurrence of pressure difference between inside and outside of the transformer container, and also preventing the insulating oil in the transformer container from leaking out during transportation.

The gas laser oscillator, constructed in accordance with a first embodiment of the invention, comprises:

at least three discharge tubes disposed in series along the optical axis of laser beam for forming a discharge space inside, a fully reflective mirror disposed toward one opening of the discharge space for composing a terminal mirror, a partially reflective mirror disposed toward other opening of the discharge space for composing an output mirror, and a spacer disposed between the partially reflective mirror and the closest discharge tube, having an opening in the center of the optical axis of laser beam, in which of the discharge tubes disposed in series along the optical axis, the sum of lengths of a pair of discharge tubes disposed at both ends in the optical axis direction supposed to be L1, the inside diameter of these discharge tubes supposed to be r1, the sum of lengths of the other discharge tubes in the optical axis direction supposed to be L2, the inside diameter of these discharge tubes supposed to be r2, and the inside diameter of the opening of the spacer supposed to be r3 satisfy the following three formula simultaneously.

$$r1/r2 > 1.0 \qquad \text{Formula 1}$$

$$L2/(L1+L2) < 0.85 \qquad \text{Formula 2}$$

$$r3/r2 < 1.4 \qquad \text{Formula 3}$$

The gas laser oscillator of another embodiment of the invention comprises:

discharge tubes disposed along the optical axis of laser beam for forming a discharge space inside, a fully reflective mirror disposed toward one opening of the discharge space for composing a terminal mirror, a partially reflective mirror disposed toward other opening of the discharge space for composing an output mirror, a first flange for holding the fully reflective mirror, a second flange for holding the partially reflective mirror, and a support element, being a member for keeping parallelism between the fully reflective mirror and the partially reflective mirror by coupling the first flange and the second flange, and having a spiral medium passage for passing cooling medium disposed inside thereof.

In the support element of the gas laser oscillator, plural spiral cooling medium passages are provided for passing cooling medium.

The gas laser oscillator comprises:

discharge tubes disposed along the optical axis of laser beam for forming a discharge space inside, a fully reflective mirror disposed toward one opening of the discharge space for composing a terminal mirror, a partially reflective mirror disposed toward other opening of the discharge space for composing an output mirror, and a high voltage power source including a switching power source for generating discharge inside the discharge tubes, a step-up transformer, and a rectifying and smoothing circuit, in which the step-up transformer includes:

a step-up transformer main body, a transformer container for storing insulating oil inside for immersing the step-up transformer main body in the inside insulating oil, and an oil cap having a penetration hole and also including a filter having resistance to passing of insulating oil in the penetration hole, being fitted to the transformer container.

In the gas laser oscillator of the invention, the penetration hole provided in the oil cap of the transformer container penetrates the oil cap in the vertical direction, and is provided with a filter having resistance to passing of insulating oil at a lower portion in the penetration hole.

In the gas laser oscillator of the invention, the penetration hole provided in the oil cap of the transformer container has one end opened to the lower end of the oil cap, and other end opened to the outer circumference of the upper part of the oil cap, and is provided with a filter having resistance to passing of insulating oil at a lower portion in the penetration hole.

In the gas laser oscillator of the invention, the penetration hole provided in the oil cap of the transformer container has one end opened to the upper end of the oil cap, and other end opened to the outer circumference of the lower part of the oil cap, and is provided with a filter having resistance to passing of insulating oil at a lower portion in the penetration hole.

In the gas laser oscillator of the invention, the pore size of the filter of the oil cap disposed in the transformer container is 0.55 mm or less.

According to the first embodiment of the gas laser oscillator, of the series of discharge tubes arranged in series, the resonance space formed in the other discharge tubes other than a pair of discharge tubes disposed at both ends is relatively narrowed, the TEM mode order of the laser beam is lowered. Besides, since scattered beam caused in the discharge tubes disposed at ends is intercepted by the spacer and is not delivered outside, so that mixing of scattered beam into the laser beam is prevented. The TEM mode order of the laser beam is lowered, light converging is improved, and mixing of scattered beams into the laser beam is prevented, so that an excellent laser beam high in processing performance and small in thermal effects in the processing peripheral area is obtained.

According to the gas laser oscillator of the second embodiment, by forming the passage for cooling medium inside the supporting element spirally, the temperature distribution of the support element is uniform, and thermal distortion of the support element can be eliminated. Since the support element is formed by coupling the flange for holding the fully reflective mirror and the flange for holding the partially reflective mirror, as the thermal distortion of the support element is eliminated, it is easier to maintain the parallelism between the fully reflective mirror and partially reflective mirror, so that a stable laser beam can be obtained.

According to the gas laser oscillator of the second embodiment, by forming a penetration hole in the oil cap of the transformer container, and disposing a filter for resisting passing of insulating oil in this penetration hole, if the insulating oil splashes due to vibration during transportation, the insulating oil will never leak out of the transformer container. Besides, since the oil film formed in the filter provided in the penetration hole is easily broken by the pressure difference between inside and outside of the transformer container, the internal pressure of the transformer container is nearly kept constant, and insulating oil will not leak out due to the pressure difference between inside and outside.

BRIEF DESCRIPTION OF THE DRAWINGS

FIG. 8 is a structural diagram explaining the cooling medium passage of support element in the conventional gas laser oscillator.

FIG. 9 is a partial diagram showing conduction and radiation of heat in a gas laser oscillator.

FIG. 10 is a sectional view showing a structure of a step-up transformer of a gas laser oscillator in a third embodiment of the invention.

FIG. 11 is a sectional view showing a first embodiment of an oil cap used in a step-up transformer of a gas laser oscillator of the invention.

FIG. 12 is a sectional view showing a second embodiment of an oil cap used in a step-up transformer of a gas laser oscillator of the invention.

FIG. 13 is a sectional view showing a third embodiment of an oil cap used in a step-up transformer of a gas laser oscillator of the invention.

FIG. 14 is a diagram showing the relation of pore size of the filter of the invention and the leak amount of insulating oil during transportation.

FIG. 15 is a block diagram showing a high voltage power source used in a gas laser oscillator.

DESCRIPTION OF THE PREFERRED EMBODIMENTS

Figure 1:
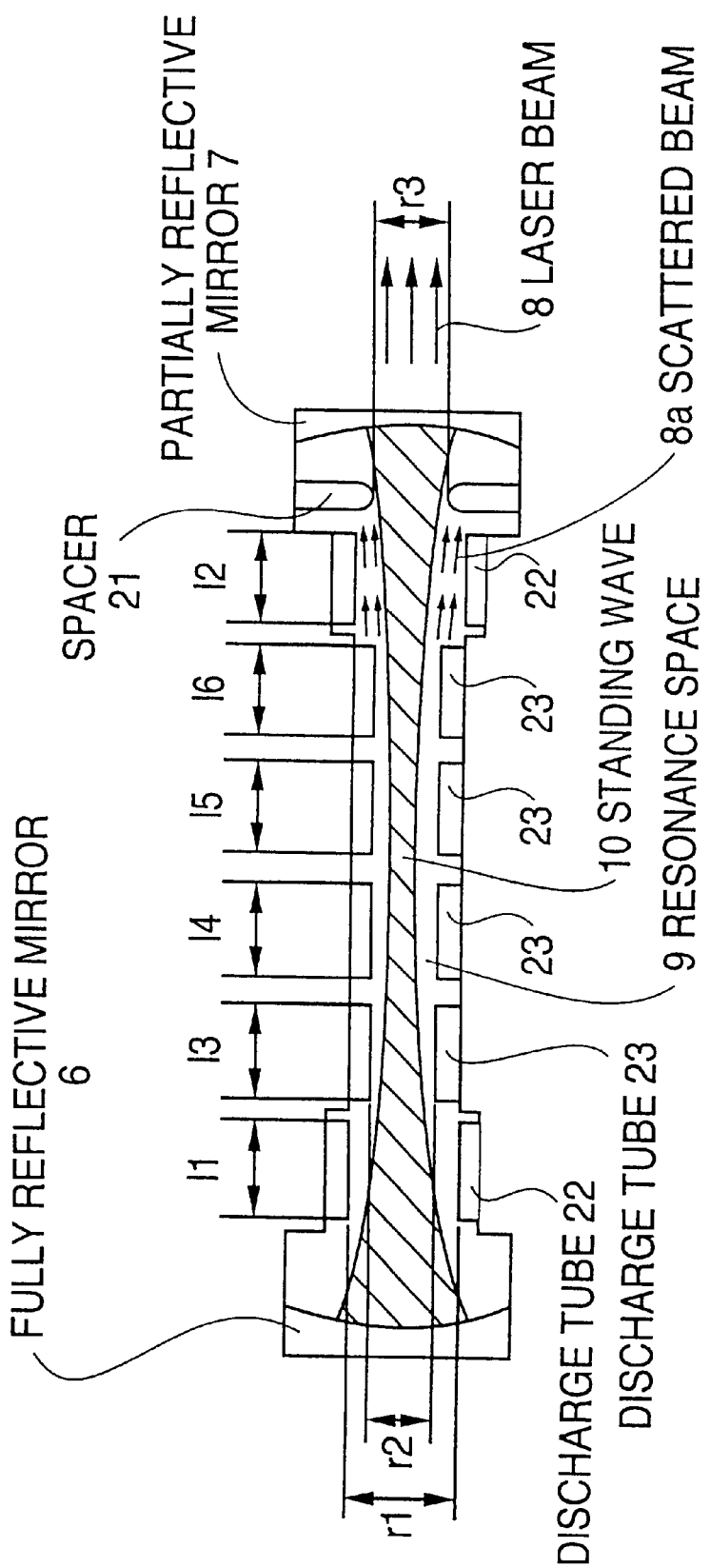
FIG. 1 is a sectional view of a gas laser oscillator constructed in accordance with a first embodiment of the invention.
Figure 4:
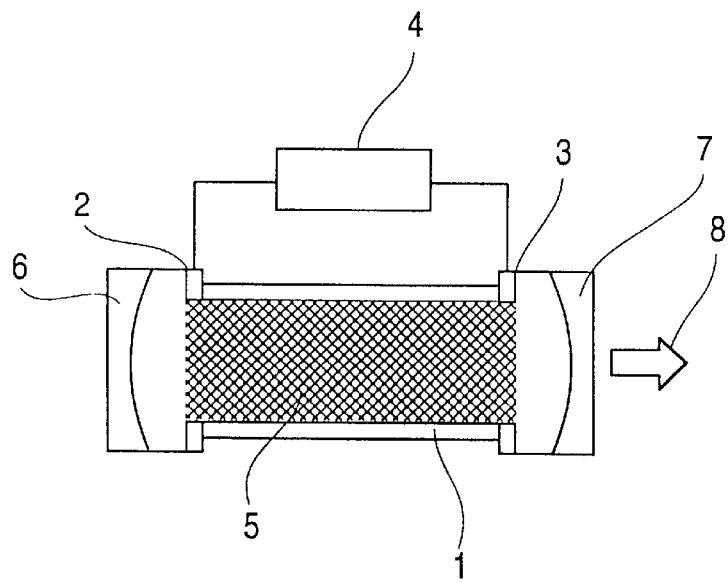
FIG. 4 is a sectional view showing a schematic representation of a conventional gas laser oscillator.
Figure 5A:
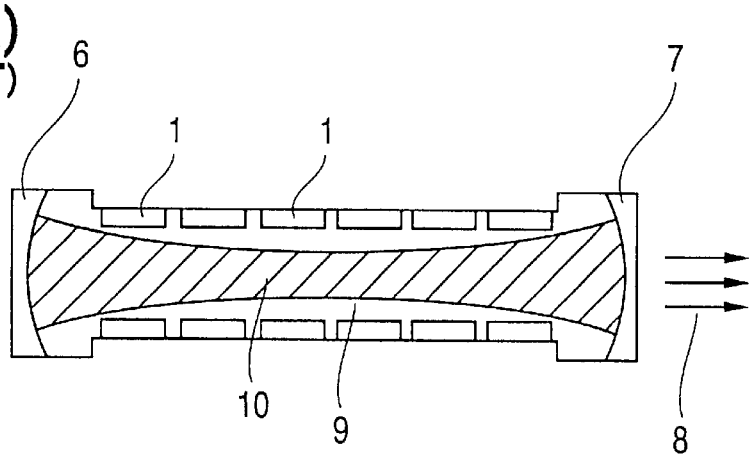
FIGS. 5(a)–(b) are structural diagrams explaining the operation of an optical resonator in the conventional gas laser oscillator.
Figure 5B:
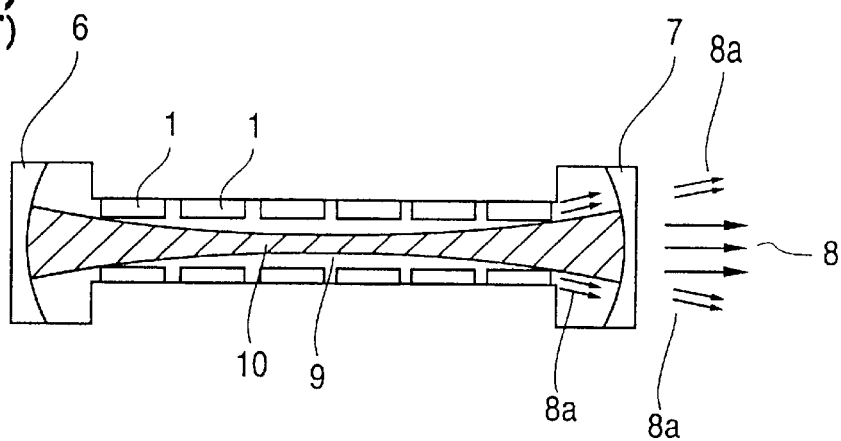

FIG. 1 shows a construction of a first embodiment of a gas laser oscillator of the present invention. Same members as the members in FIG. 4 and FIG. 5 are identified with same reference numerals also in FIG. 1 and their explanations are omitted. FIG. 1 is a sectional view of a gas laser oscillator, and in FIG. 1, reference numeral 21 is a spacer having an opening having a specified inside diameter with the center on the optical axis of a laser beam 8, and reference numerals 22 and 23 are a plurality of (six in FIG. 1) discharge tubes disposed in series along the optical axis of the laser beam, and a pair of discharge tubes 22 out of these discharge tubes are disposed at both ends of the optical axis, that is, at both ends closest to a fully reflective mirror 6 and a partially reflective mirror 7, while the other discharge tubes 23 are disposed between the pair of discharge tubes 22.

In FIG. 1, the discharge tubes 22 and discharge tubes 23 are shown as mere tubular bodies, but in the individual discharge tubes 22 and discharge tubes 23, same as the discharge tubes 1 shown in FIG. 4, a pair of electrodes, equivalent to electrode 2 and electrode 3, are disposed at both ends of each tubular body. A high voltage power source is connected between each pair of electrodes, and a discharge space is formed individually in the discharge tubes 22 and discharge tubes 23. However, such arrangement is not directly related to the nature of the invention, in FIG. 1, the discharge tubes 22 and discharge tubes 23 are expressed as mere tubular bodies.

Herein, supposing the inside diameter of the pair of discharge tubes 22 disposed at both ends of the optical axis to be r1, the sum of the lengths of the pair of discharge tubes to be L1 (=l1+l2), the inside diameter of the other discharge tubes 23 except for the pair of discharge tubes 22 to be r2, the sum of the length of the other discharge tubes 23 except for the pair of discharge tubes 22 to be L2 (=l3+l4+l5+l6), and the inside diameter of the opening of the spacer to be r3, the gas laser oscillator of the first embodiment is composed so as to satisfy the following three formulas simultaneously.

$$r1/r2 > 1.0 \quad \text{Formula 1}$$

$$L2/(L1+L2) < 0.85 \quad \text{Formula 2}$$

$$r3/r2 < 1.4 \quad \text{Formula 3}$$

Thus, as long as the shapes of the discharge tubes 22, discharge tube 23 and spacer 21 simultaneously satisfy the three formulas (formula 1, formula 2, and formula 3), the inside diameter r2 of the discharge tubes 23 is smaller than the inside diameter r1 of the discharge tubes 22. As a result, the internal portion of the discharge tubes 23 in the resonance space 9 is relatively narrower than the internal portion of the discharge tubes 22, and the TEM mode order of the laser beam 8 is lowered. On the other hand, the inside diameter r1 of the discharge tubes 22 disposed at both ends in the optical axis direction is larger than the inside diameter of the discharge tubes 23 disposed in the middle, and therefore when the scattered beam 8a generated in the resonance space 9 inside the discharge tubes 23 passes through the inside of the discharge tubes 22, it diverges toward the outside of the resonance space due to diffraction. This scattered beam 8a diverging toward the outside is intercepted by the spacer 21, and is not delivered outside, thereby preventing the scattered beam 8a from mixing into the output laser beam 8.

Figure 2A:
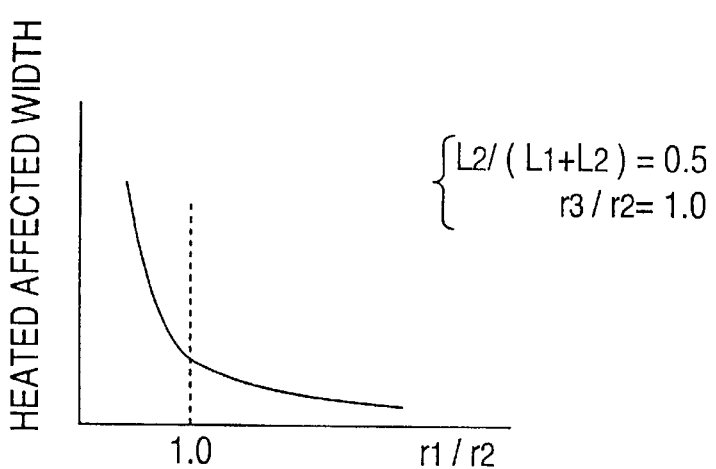
FIGS. 2(a)–(c) are diagrams showing the effects of a discharge tube and spacer shape on convergence of a laser beam in the gas laser oscillator in the first embodiment of the invention.

FIGS. 2(a), (b) and (c) are diagrams showing the effects of the inside diameter and length of the discharge tubes 22 and discharge tubes 23 and inside diameter of the spacer 21 on the converging performance of laser beam. In these diagrams, as the parameters for evaluating the converging performance of laser beam, the width of the heat affected zone by cutting a mild steel plate by laser beam was used. The width of the heat affected zone was measured on the basis of the cut-off line.

FIG. 2(a) shows the relation between r1/r2 change and heat affected width, supposing L2/(L1+L2) to be 0.5 and r3/r2 to be 1. As clear from this diagram, when the value of r1/r2 is larger than 1, that is, when the inside diameter r1 of the discharge tubes 22 disposed at both ends in the optical axis direction is larger than the inside diameter r2 of the discharge tubes 23 disposed in the middle, the occurrence of scattered beams 8a is suppressed, and the heat affected width is smaller.

Figure 2B:
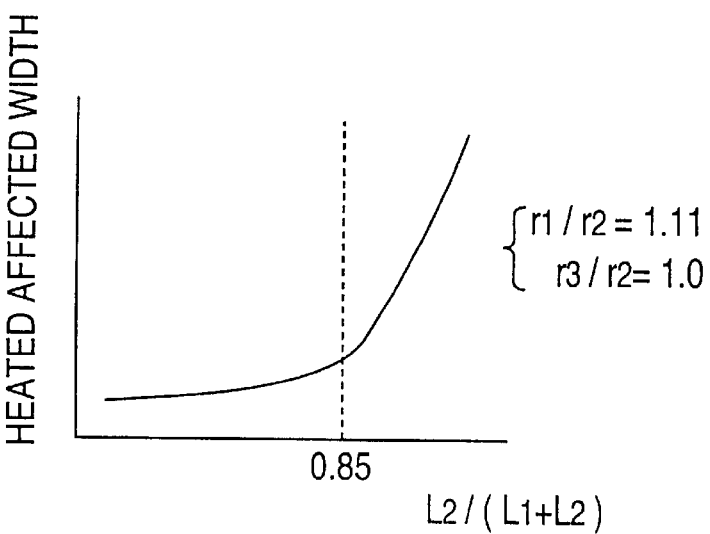

FIG. 2(b) shows the relation between L2/(L1+L2) change and heat affected width, supposing r1/r2 to be 1.11 and r3/r2 to be 1. As clear from this diagram, when the value of L2/(L1+L2) exceeds 0.85, the heat affected width increases suddenly, and hence the value of L2/(L1+L2) should be less than 0.85.

Figure 2C:
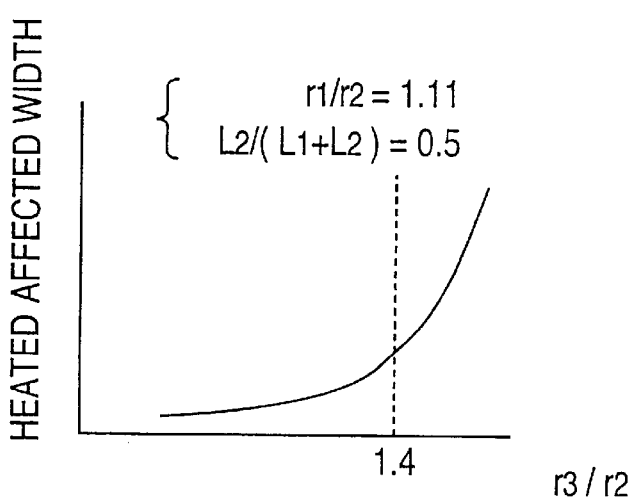

FIG. 2(c) shows the relation between r3/r2 change and heat affected width, supposing r1/r2 to be 1.11 and L2/(L1+L2) to be 0.5. As clear from this diagram, when the value of r3/r2 exceeds 1.4, the heat affected width increases suddenly. Hence, the value of r3/r2 must be set at less than 1.4. It suggests that the intercepting effect of scattered beam 8a by the spacer 21 is reduced when the inside diameter r3 of the opening of the spacer 21 is too large compared with the inside diameter r2 of the discharge tubes 23. In other words, the spacer 21 having an opening of an appropriate inside diameter is effective for intercepting the scattered beam 8a.

Figure 3A:
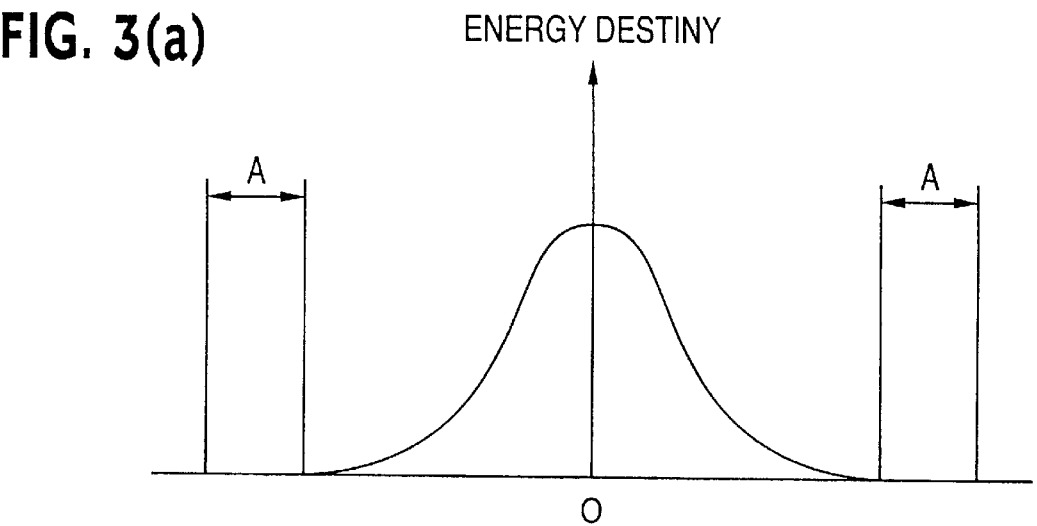
FIGS. 3(a)–(b) are diagrams showing effects by the gas laser oscillator in the first embodiment of the invention.
Figure 6:
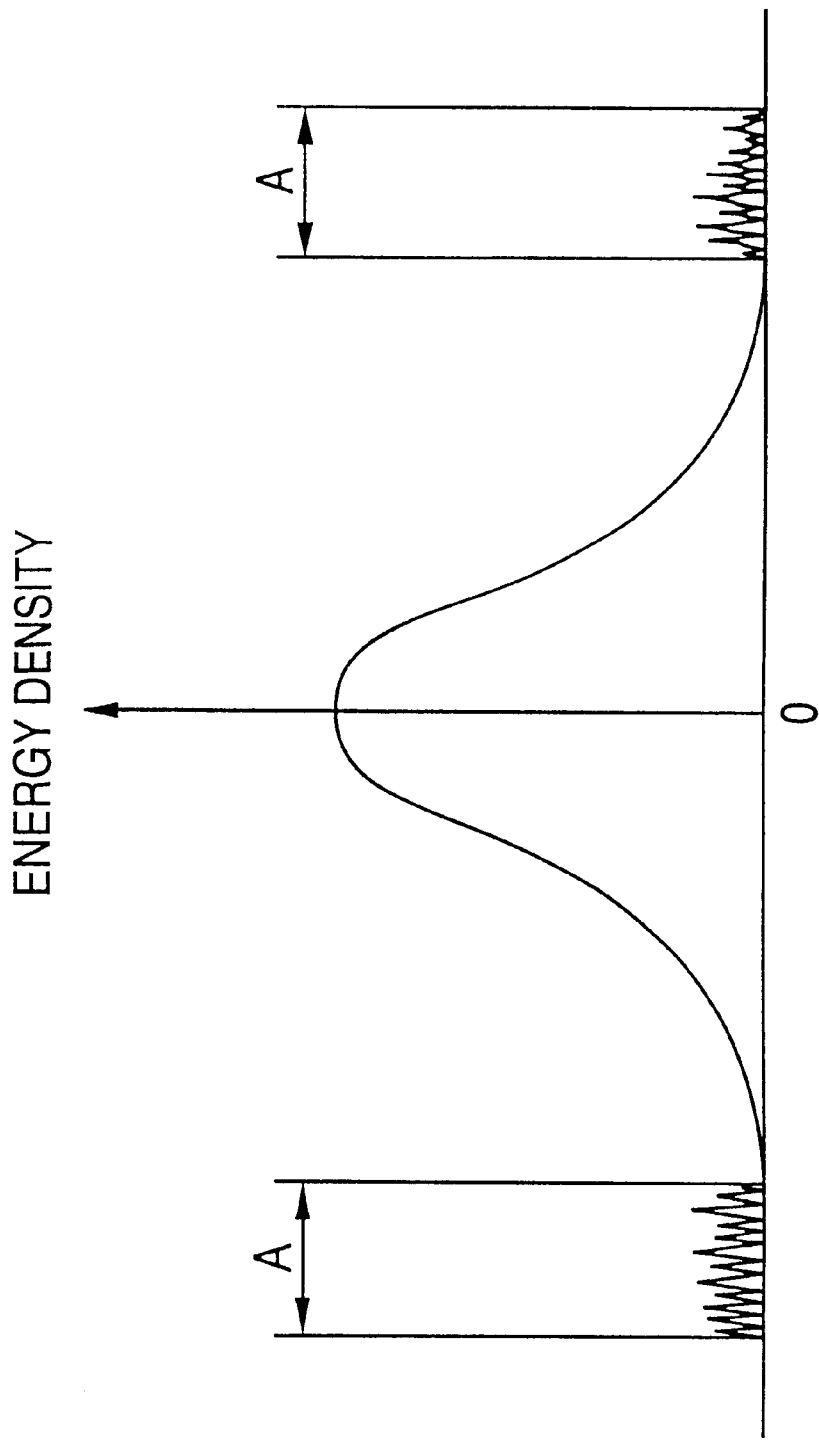
FIG. 6 is a diagram showing the output mode of laser beam in the conventional gas laser oscillator.

FIG. 3 is a diagram that explains the effect of the first embodiment of the gas laser oscillator of the invention. FIG. 3(a) shows the output mode of the output laser beam 8 of the gas laser oscillator according to the first embodiment of the invention. As is clear from a comparison between FIG. 3(a) and FIG. 6, the laser beam issued from the gas laser oscillator of the invention is free from scattered beam in the peripheral region A, and a laser beam of high quality is obtained.

Figure 3B:
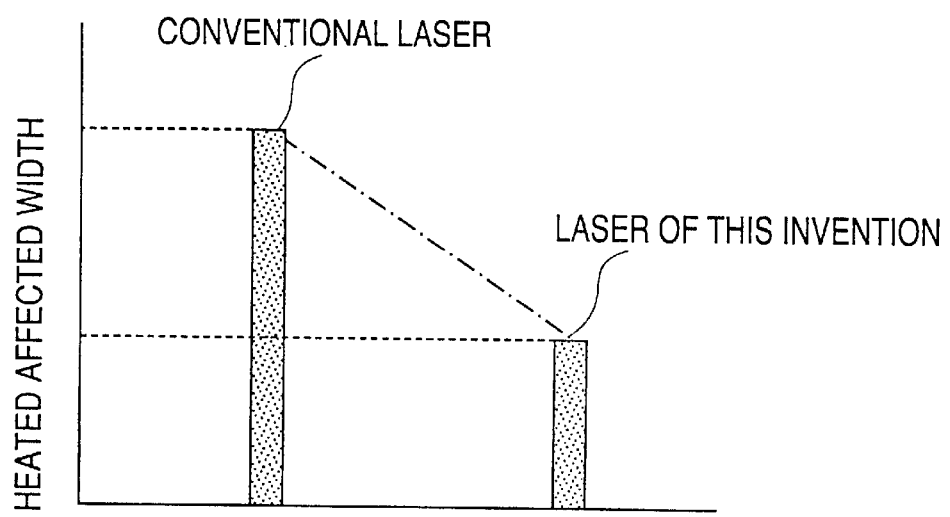

FIG. 3(b) compares with heat affected width by cutting of mild metal plate, between the conventional gas laser oscillator and gas laser oscillator in the first embodiment of the invention. The embodiment of the invention and the prior art is compared by representing the heat affected width on the axis of ordinates. As is clear from FIG. 3(b), in the gas laser oscillator of the invention, the heat affected width can be notably decreased as compared with the conventional gas laser oscillator.

As explained herein, according to the gas laser oscillator of the first embodiment of the invention, the TEM mode order of output laser beam can be lowered, and mixing of scattered beam into the output laser beam can be prevented, so that an output laser beam of high converging performance and high quality can be obtained. Therefore, by using this gas laser oscillator, a high processing performance is obtained, and laser processing of high quality is realized.

Figure 7A:
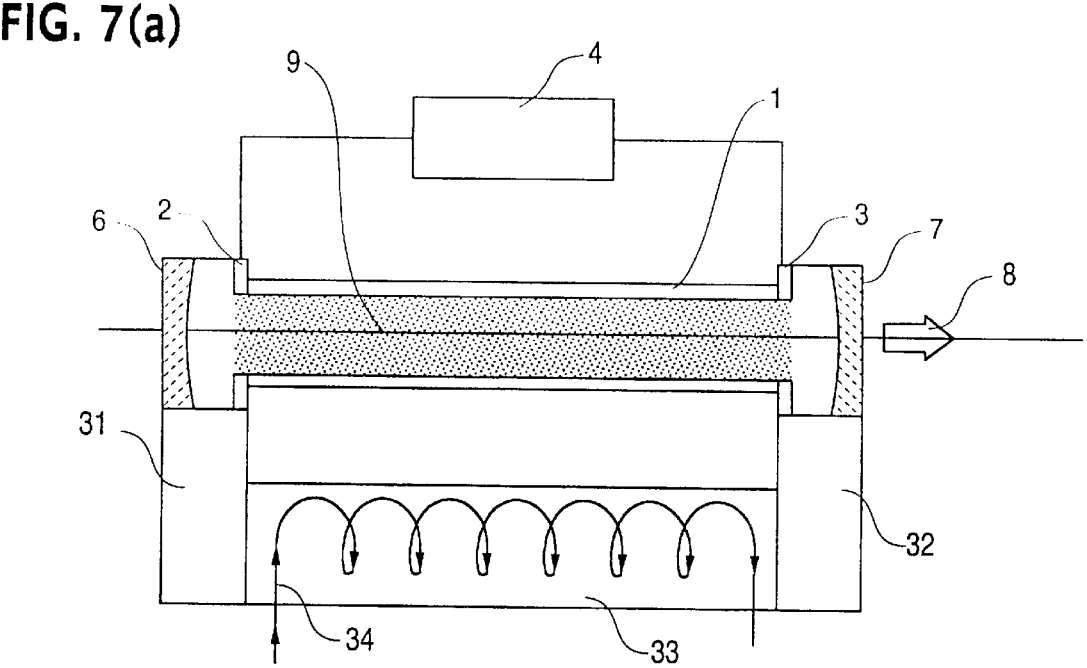
FIGS. 7(a)–(b) are sectional views showing a construction of a gas laser oscillator constructed in accordance with a second embodiment of the invention.

FIG. 7(a) shows a structural example of a gas laser oscillator constructed in accordance with a second embodiment of the invention. The basic components are same as in the conventional gas laser oscillator explained in FIG. 4, but the construction is newly described below including the basic components. In FIG. 7(a), reference numeral 1 is a discharge tube, 2 and 3 are electrodes, 4 is a high voltage power source for supplying electric power for discharging between the electrodes 2 and 3, 6 is a fully reflective mirror, and 7 is a partially reflective mirror, and the fully reflective mirror 6 and partially reflective mirror 7 are combined to form an optical resonator. Reference numeral 8 is a laser beam issued through the partially reflective mirror 7, reference numeral 9 is a resonance space, reference numeral 31 is a flange for holding the fully reflective mirror 6, reference numeral 32 is a flange for holding the partially reflective mirror 7, reference numeral 33 is a support element coupling the flange 31 and flange 32, and reference numeral 34 is a passage for passing cooling medium disposed inside the support element 33.

In this embodiment, the passage 34 of cooling medium is formed spirally inside the support element 33. In such passage 34, the cooling medium flows spirally inside the support element 33, and thereby the support element 33 is cooled uniformly without causing a temperature difference between upper part and lower part of the support element 33 due to convection of cooling medium. Therefore, thermal distortion, conventionally induced by temperature difference in the parts of the support element 33, does not occur in the present invention. As a result, it is easy to maintain the parallelism between the fully reflective mirror 6 and partially reflective mirror 7 held by the flange 32 and flange 33 coupled by the support element 33.

Figure 7B:
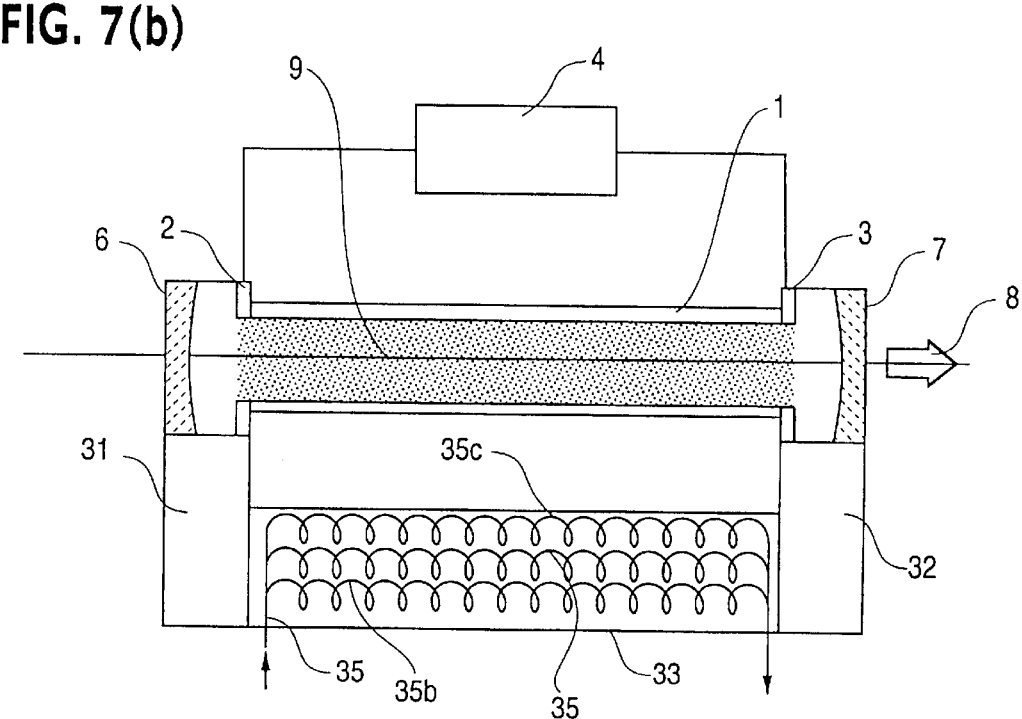
Figure 16:
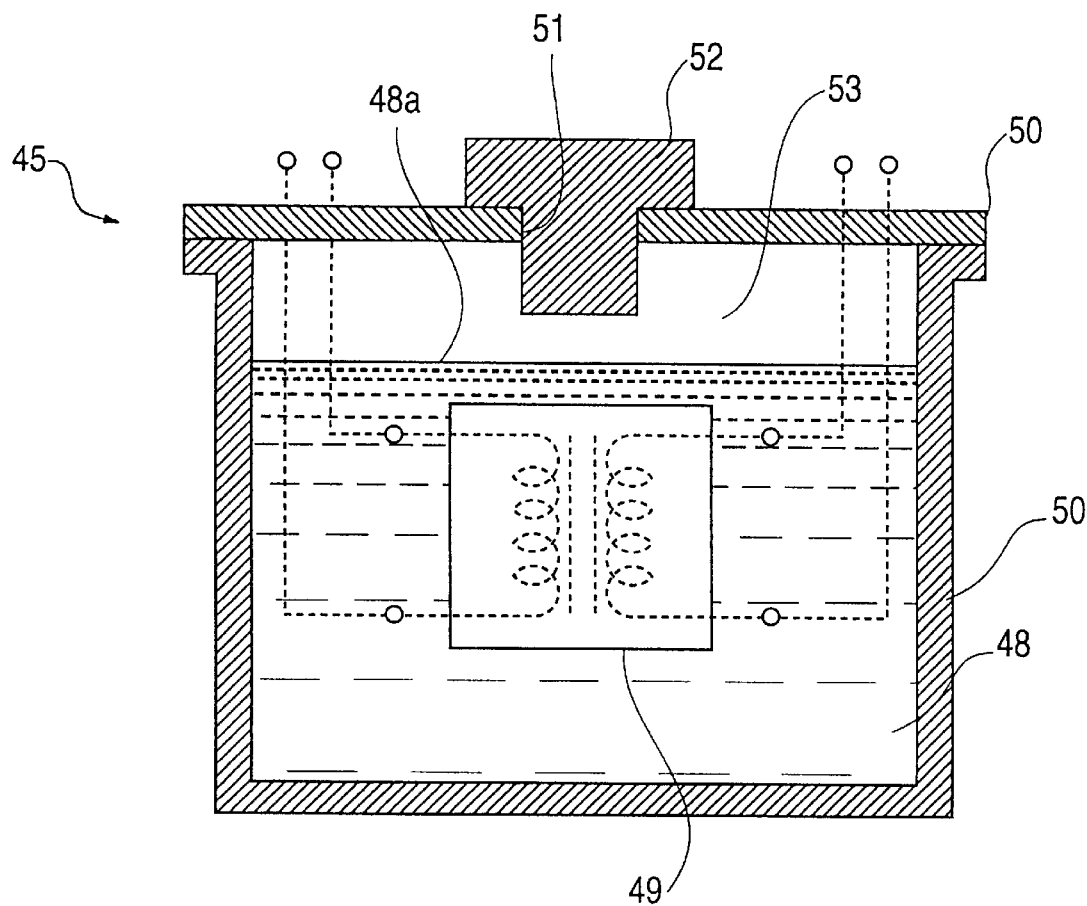
FIG. 16 is a sectional view showing a structure of a step-up transformer of a conventional gas laser oscillator.
Figure 17:
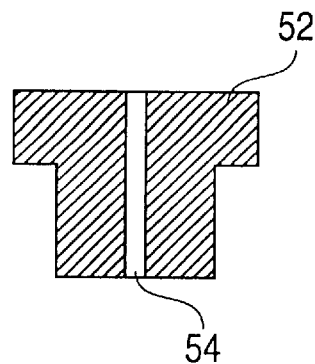
FIG. 17 is a sectional view of a conventional oil cap having a straight penetration hole.

FIG. 7(b) shows a modified example of the gas laser oscillator in the second embodiment of the invention. In the structural example shown in FIG. 7(a), the passage 34 for cooling medium provided in the support element 33 was one system of spiral passage, but plural systems may be formed as in a passage 35 shown in FIG. 7(b). For example, a passage 35a is provided inside the support element 33, a second passage 35b and a third passage 35c are disposed on the parts close to the surface of the support element 33. By forming plural systems of the passage 35 for the cooling medium, the cooling effect is enhanced and more uniform cooling is realized. In FIG. 7(b), the inlets and outlets of the plural systems of passages 35a, 35b, 35c are gathered at one position each, but the inlets and outlets of plural systems of passages for cooling medium may be also located independently in each passage. Therefore, the inlets and outlets of plural systems of passages for cooling medium are also located independently in each passage, and the cooling medium flowing direction may be reverse in each passage, and the temperature distribution of the support element 33 may be more uniform.

Alternatively, the support element 33 may be divided into a plurality of sections, and at least one system of spirally formed passage for cooling medium may be provided for each divided section of the support element.

As explained herein, according to the gas laser oscillator of the second embodiment of the invention, since the support element can be cooled uniformly, the temperature distribution is uniform, the support element is free from thermal distortion, and it is easy to maintain the parallelism between the fully reflective mirror and partially reflective mirror for composing the optical resonator, so that a stable laser beam may be obtained.

FIG. 10 shows a step-up transformer 45 used in a gas laser oscillator in a third embodiment of the invention. In FIG. 10, a transformer container 47 contains an insulating oil 48, and a step-up transformer main body 49 is fixed in the transformer container 47 so as to be completely immersed in the insulating oil 48. The transformer container 47 has a top plate 50 so as to keep airtight at the junction, and an oil cap 52 having a vertical penetration hole 54 is fitted to the top plate 50 so as to keep airtight at the junction. A filter 55 having resistance to passing of the insulating oil 48 is provided in the vertical penetration hole 54 provided in the oil cap 52. The filter 55 is made of foamed urethane or a similar material that has resistance to oil.

Thus, in this step-up transformer 45, the insulating oil 48 splashing up due to vibration during transportation sticks to the top plate 50, or partly invades into the penetration hole 54 in the oil cap 52 to be absorbed on the filter 55. On the pores of the filter 55 absorbing the insulating oil 48, an oil film is formed due to surface tension of the insulating oil 48 itself. By this oil film, passing of insulating oil 48 is blocked, and leak of insulating oil from the transformer container 47 is prevented.

However, if the pore size is too large, forming of oil film of insulating oil 48 on the filter 55 is impaired, and the effect of arresting passing of insulating oil 48 by the oil film is lost. FIG. 14 is a diagram showing the relation between the pore size of filter material and leak of insulating oil during transportation. According to FIG. 14, when the pore size of the filter material exceeds 0.55 mm, the insulating oil leaks during transportation, and it is known that, as the material for the filter 55, an oil resistant and foaming material with pore size of 0.55 mm or less must be selected.

On the other hand, due to heat generation of the step-up transformer main body 49, the atmospheric pressure in the transformer container 47 is raised, and an atmospheric pressure difference occurs between the inside and outside of the transformer container 47. Due to this atmospheric pressure difference between the inside and outside of the transformer container 47, the oil film formed in the pores of the filter 55 is broken, and only the air inside the transformer container 47 is discharged outside, so that the atmospheric pressure in the transformer container is kept almost constant.

The filter 55 is provided only in a lower portion of the penetration hole 54 of the oil cap 52, and a space is left in the upper part of the penetration hole 54. This space is provided so that oil drops may not pop out of the penetration hole if the oil film is broken and oil drops splash upward. Part of the insulating oil 48 splashing out as the oil film is torn by the atmospheric pressure difference sticks to the inner wall of the penetration hole 54, but moves downward due to gravity, and is absorbed on the filter 55, and forms an oil film again.

Figure 18:
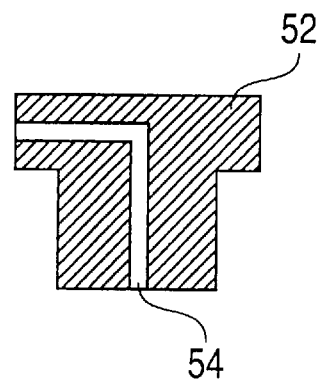
FIG. 18 is a sectional view of a conventional oil cap having an inverted L-shaped penetration hole.
Figure 19:
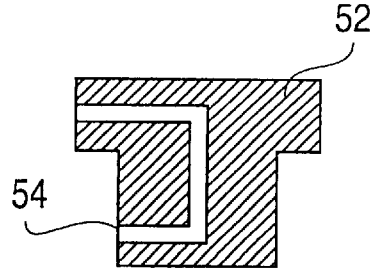
FIG. 19 is a sectional view of a conventional oil cap having a lateral U-shaped penetration hole.

It is effective whether the shape of the penetration hole 54 is an inverted L-form as shown in FIG. 18 relating to the prior art or a lateral U-form as shown in FIG. 19, and still more FIG. 12 and FIG. 13 show the shapes of the penetration hole in consideration of the effect of recovering the insulating oil 48 sticking to the inner wall of the penetration hole 54 to the filter 55.

The penetration hole shown in FIG. 12 is composed of a vertical portion 54a and a slope 54b. The vertical portion 54a is opened only beneath the oil cap 52, and does not penetrate upward. The slope 54b penetrates obliquely upward starting from the upper end of the vertical portion 54a, and is opened to the outside of the transformer container. The filter 55 is inserted only in the vertical portion 54a.

When the penetration hole is thus formed, since the filter 55 is inserted only in the vertical portion 54a, it is advantageous that the space from the filter 55 to the outside is kept wide. If the oil film of the filter 55 is broken, oil drops only splash around the filter 55, not reaching to outside of the transformer container 47. Part of oil drops sticking to the inner wall of the slope 54b moves downward by the gravity, and is absorbed in the filter 55 in the vertical portion 54a.

The penetration hole shown in FIG. 13 is formed of a vertical portion 54a and a slope 54b. The vertical portion 54a is opened only above the oil cap 52, and does not penetrate downward. The slope 54b penetrates obliquely downward starting from the lower end of the vertical portion 54a, and is opened to the inside of the transformer container. The filter 55 is inserted only into the slope 54b.

When the penetration hole is thus formed, since the filter 55 is inserted only in the slope 54b, it is advantageous that the space from the filter 55 to the outside is kept wide. If the oil film of the filter 55 is broken, oil drops only splash around the filter 55, not reaching to outside of the transformer container 47. Part of oil drops sticking to the inner wall of the vertical portion 54a moves downward by gravity, and is absorbed in the filter 55 in the slope 54b.

In the gas laser oscillator in the third embodiment of the invention, as described herein, by installing an oil resistant filter of an appropriate pore size, having resistance to passing of insulating oil, in the penetration hole of the oil cap, it is effective to prevent insulating oil from leaking out of the oil cap due to vibration during transportation. Besides, since the oil film formed in the filter is broken by a slight atmospheric pressure difference between the inside and outside of the transformer container, the atmospheric pressure in the transformer container is almost kept constant, and therefore leakage of insulating oil due to the pressure difference between the inside and outside the transformer container does not occur.

What is claimed is:

1. A gas laser oscillator comprising:

(a) discharge tubes disposed along the optical axis of laser beam for forming a discharge space inside, (b) a fully reflective mirror disposed toward one opening of said discharge space for composing a terminal mirror, (c) a partially reflective mirror disposed toward other opening of said discharge space for composing an output mirror, (d) a first flange for holding said fully reflective mirror, (e) a second flange for holding said partially reflective mirror, and (f) a support element, being a member for keeping parallelism between said fully reflective mirror and said partially reflective mirror by coupling said first flange and said second flange, and having a spiral medium passage for passing cooling medium disposed inside thereof.

2. A gas laser oscillator of claim 1, wherein plural systems of spiral cooling medium passages are formed in said support element.

* * * * *